United States Patent [19]  
Correll

[11] 3,904,094  
[45] Sept. 9, 1975

[54] LADDER RACK
[76] Inventor: Richard R. Correll, 2 Maple Ave., Atherton, Calif. 94025
[22] Filed: Sept. 6, 1973
[21] Appl. No.: 394,948

[52] U.S. Cl. .......................... 224/42.1 F; 248/361 B
[51] Int. Cl. ............................................... B60m 9/04
[58] Field of Search .... 224/42.1 F, 42.1 E, 42.45 R, 224/42.4, 29 R, 42.38; 248/361 R, 361 B; 280/179 R

[56] References Cited  
UNITED STATES PATENTS

| 2,134,823 | 11/1938 | Herrmann et al. | 248/361 B |
| 3,251,519 | 5/1966 | Jones | 224/42.4 X |
| 3,622,057 | 11/1971 | Marker | 224/42.1 F |

FOREIGN PATENTS OR APPLICATIONS

| 800,941 | 7/1949 | Germany | 224/42.1 F |

Primary Examiner—Albert J. Makay  
Assistant Examiner—Jerold M. Forsberg  
Attorney, Agent, or Firm—Townsend and Townsend

[57] ABSTRACT

Ladders and like implements used by repairmen are often carried on a rectangular frame which attaches to the roof portion of a vehicle such as a van. The present invention provides a bracket which releasably attaches the ladder or other implement to the frame. The bracket includes a spring which biases the bracket against the ladder or other implement to attach it to the frame. A handle is manually operable to move the bracket against the spring to release the ladder and the same spring acts to lock the bracket in the released position. The handle has a mechanical advantage and extends beyond the vertical plane of the van wall so that the bracket can easily be operated by a person standing alongside the van.

8 Claims, 4 Drawing Figures

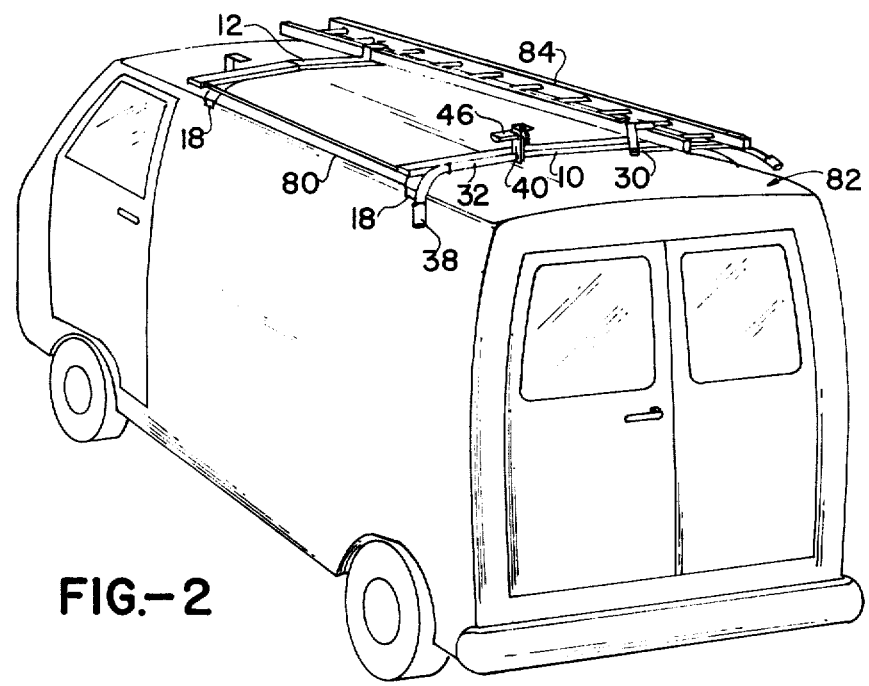
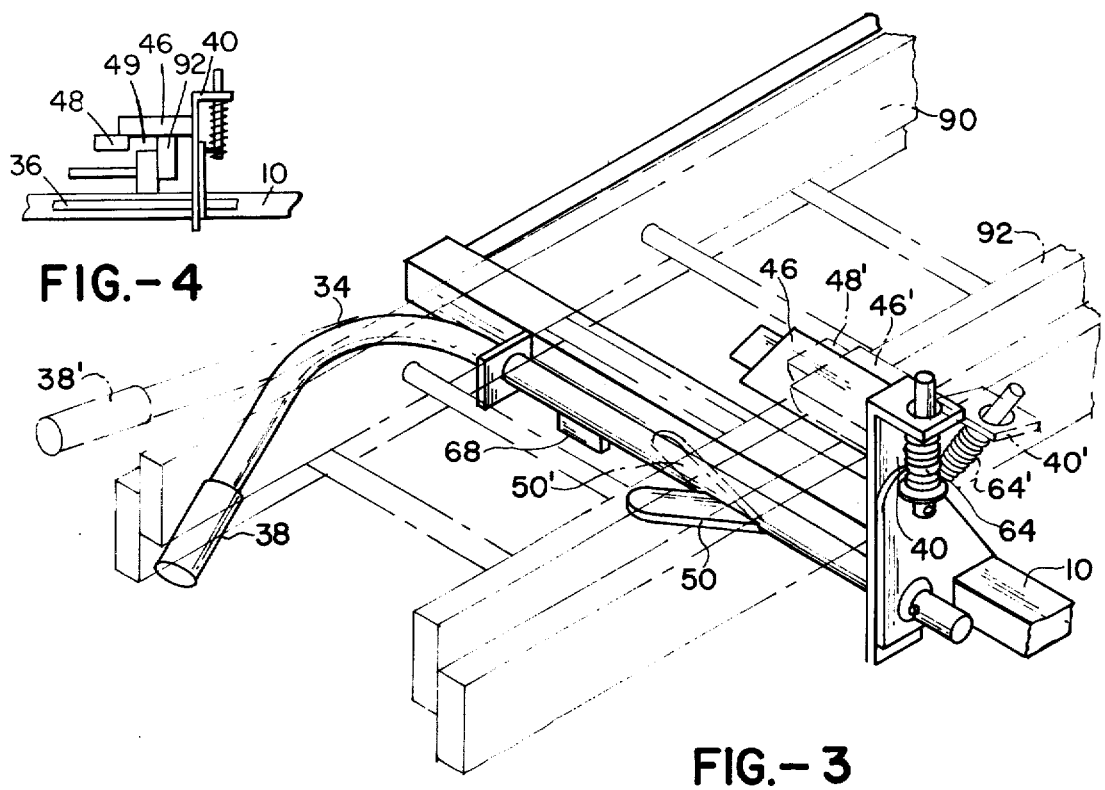

LADDER RACK

BACKGROUND OF THE INVENTION

The present invention relates to ladder racks, and particularly to engagement mechanisms for ladder racks which are releasably attachable to the roof portion of a vehicle.

In many endeavors in which a repairman, such as a telephone lineman, must operate in the field, it is essential that the repairman be provided with ladders for his work. When the repairman drives a truck of the van variety, as is customary, the only safe place for putting the ladders is over the roof of the vehicle. Since a van has flat sides, placing the ladders on the sides of the van could create a safety hazard, and most vans are too short to carry the ladders inside. When ladders are stored over the roof of the van, it is customary to provide a rectangular rack to support the ladders. The ladders are placed on top of the rack, and are then secured to the rack in some manner so that the ladders will not become dislodged when the truck moves.

The mechanism used to secure the ladders to the rack must be operable by the repairman while standing alongside the van for convenience. The most popular method presently used for securing the ladders to the rack employs a substantially vertical arm which fits through a sleeve on the side of the rack, and which has a bracket at its upper end which engages the outer rail of the ladder. A coil spring is provided around the arm and biases the arm downwardly so that the bracket is forced into engagement with the ladder. A handle is provided at the lower end of the arm for engagement and release of the bracket, and the handle can be operated by a person standing alongside the van.

In the above device, the ladder is released from the rack by pushing upward on the handle against the force of the spring to disengage the bracket, then turning the handle 90°-180° and letting the arm snap downward. Conversely, to attach the ladder, the handle is forced upwardly against the spring, and the handle rotated back 90°-180° to place the bracket over the rail of the ladder. The handle is then lowered so that the bracket engages the rail of the ladder. The attachment mechanism has the advantage that it is operable from the side of the vehicle, but this type of apparatus has encountered certain problems in its actual use.

In this device, the full force of the spring has to be directly counteracted in an upward direction overhead by the operator in order to release or engage the ladder. No provision is made for employing mechanical advantage to reduce the force which must be applied by the operator. Also, the device has to be twisted 90°-180° while biased against the spring. The combination of the large amount of overhead force required, and the twisting of the apparatus as the force is applied, made the apparatus quite difficult to operate in practice. More importantly, the vertical overhead twisting required as the force is applied can result in the operator injuring his back. Since a repairman commonly removes and replaces the ladders several times a day, the possibility of back injury with this device can be a significant problem. However, since the spring has to be relatively strong to hold the ladders in place, the problems inherent in the device cannot be relieved by decreasing the tension force in the spring.

SUMMARY OF THE INVENTION

The present invention provides an improved means for releasably attaching ladders to the cross members of a frame. A short upright arm is pivotally attached by its lower end to one of the cross members so that the arm is pivotable about an axis generally parallel to the cross member. A finger extending transversely from the free end of the arm is adapted to engage the rail of a ladder when the arm is pivoted downwardly. Bias means are provided to pivotally bias the arm downwardly and to thereby bias the finger against the rail of the ladder. Lever means are provided which are manually operable to upwardly pivot the arm to allow for insertion and removal of the ladder.

The generally upright pivotal arm has an apertured portion extending horizontally from its free end, and the bias means includes a short rod pivotally attached to the cross member above the pivotal axis of the arm. The rod extends through the apertured portion of the arm, and a coil spring is slipped over the rod and is compressed against the apertured portion of the arm. In this manner, the bias means pivotally biases the arm away from its vertical middle position between its hold-down and release positions so that the finger is biased against the rail of a ladder supported on the cross member. The lever has a handle portion which is operable to move the arm against urging of the bias means to allow for insertion and removal of the ladder. The lever provides mechanical advantage so that the force required to release the spring is far less than the force actually exerted by the spring to hold the ladder.

The mechanical advantage of the lever substantially reduces the forces which must be exerted by the operator to release and engage the ladder. The lever is pivoted about a fixed axis, and does not require the overhead pushing and twisting motion which caused back injuries in using the previous devices. The spring tension which can be used to fix the ladder to the rack can be significantly greater than that of prior devices since the mechanical advantage of the lever decreases the force which has to be exerted by the operator against the spring.

In the present invention, the spring operates to force the arm pivotally downward either forwardly or backwardly. The arm pivots forward to a closed or ladder-hold-down position. A stop is provided which prevents rearward pivoting of the arm at a position slightly past vertical so that when the arm is pivoted backwardly and engages the stop, the bias means locks the arm in an open or "ladder-release" position so that the ladders can be easily removed and re-inserted. Only a small amount of force is needed to overcome the bias means to move the arm from its hold-down position to the ladder-release position, so that little force need be applied by the operator to secure the ladders to the rack. Since the ladders are inserted and removed several times a day, the care and safety with which this operation can be performed with the present invention is significant.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood that the drawings are for the purpose of illustration and description only and are not intended as a definition of the limits of the invention.

BRIEF DESCRIPTION OF THE DRAWINGS

FIG. 2 is a perspective view of the ladder rack of the present invention as mounted on a van;

FIG. 3 is a fragmentary view illustrating the operation of the present invention.

FIG. 4 is a fragmentary rear elevation view illustrating the confinement of the ladder by the rack.

DESCRIPTION OF THE PREFERRED EMBODIMENT

Figure 1:
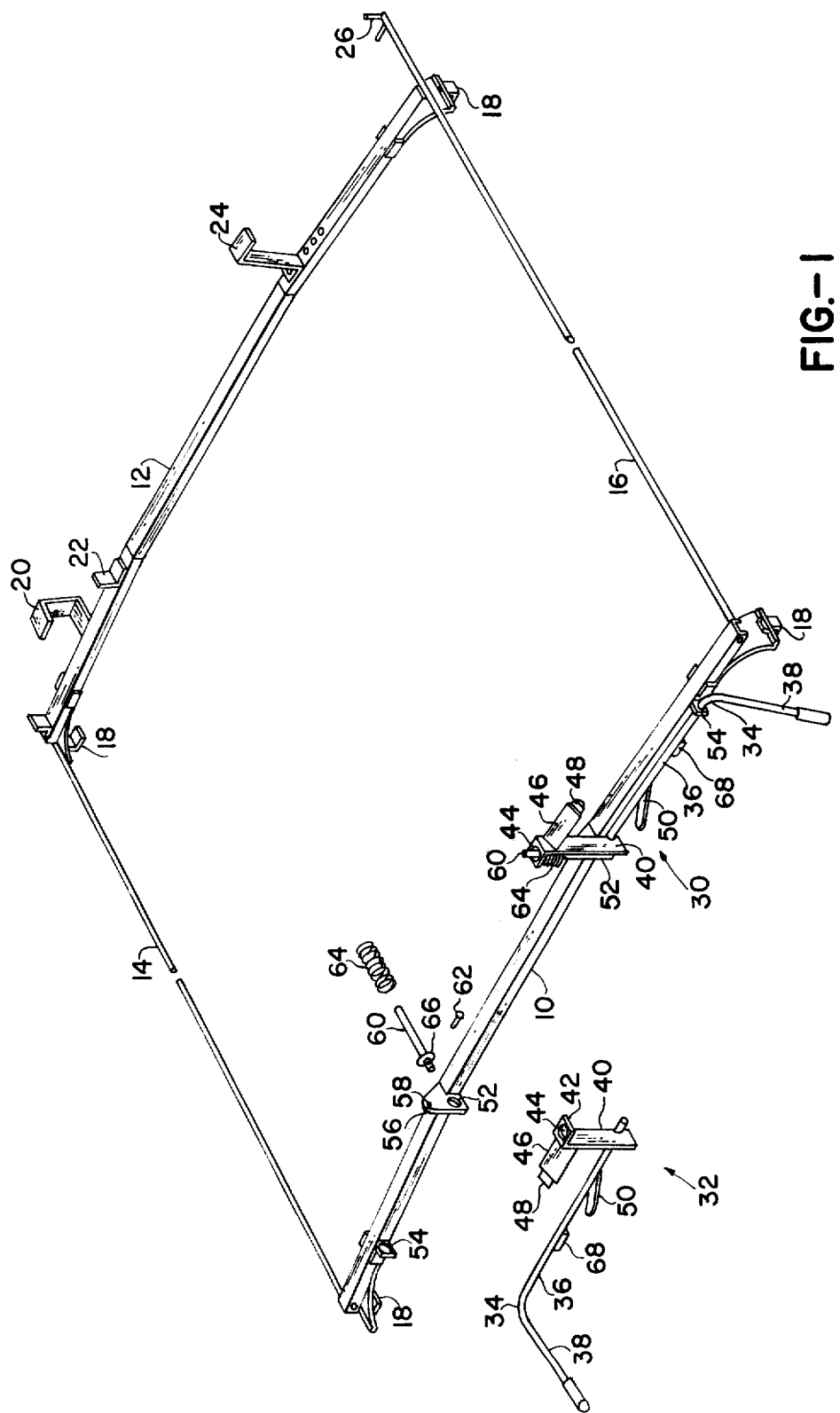
FIG. 1 is a perspective view of the ladder rack of the present invention, illustrating one of the attachment mechanisms in its ladder-hold-down position and another of the attachment mechanisms in its ladder-release position.

A ladder rack incorporating the features of the present invention is illustrated by way of reference to FIG. 1. The rack comprises cross members 10 and 12 on which the ladders are placed for support. The ends of cross members 10 and 12 are angled downwardly as illustrated to facilitate insertion and removal of the ladders on the cross members. Side members 14 and 16 span between the ends of cross member 10 and 12 to form a rigid rectangular frame. The detachable brackets 18 on the ends of cross members 10 and 12 allow the ladder rack to be fastened to the top of a van. A variety of different types of angular stops such as 20, 22 and 24 are provided on cross member 12 to prevent movement of the ladder when abutted against them.

The present invention provides dual attachment mechanisms 30 and 32 mounted on one of the cross members 10, opposite from cross member 12 which contains the angular stops 20, 22 and 24. One attachment mechanism is provided for each ladder. For illustrative purposes, attachment mechanism 30 is shown in assembly connected to cross member 10, and attachment mechanism 32 is shown disassembled. Attachment mechanisms 30 and 32 are similar, being merely mirror images of each other, and corresponding elements of the two attachment mechanisms are numbered the same herein.

The attachment mechanisms 30 and 32 each have a lever 34 comprising a longitudinal portion 36 and a handle portion 38, with the handle portion angularly joined to the longitudinal portion. Arm 40 is fixedly attached to longitudinal portion 36 of lever 34 at the opposite end from handle 38. Arm 40 has a horizontal portion 42 with an aperture 44 therein. A transverse finger 46 extends from the top of vertical member 40 to form the attachment bracket. A projection 48 is provided at the end of transverse finger 46 so that a notch 49 and is formed in the finger 46 as illustrated in FIG. 4 to confine ladder rail 92 between the projection and arm 40 to prevent transverse movement of the ladder. A tab 50 is provided on longitudinal portion 36 of lever 34 to provide a ladder stop, as will hereinafter be more fully illustrated.

Lever 34 is rotatably attached to cross member 10 by inserting longitudinal portion 36 through inner and outer bushing members 52 and 54 respectively. Inner bushing member 52 has an enlarged portion 56 which has a small aperture 58 therethrough. Rod 60 is pivotally attached to the enlarged portion 56 of bushing member 52 by a pin 62 which passes through the end of the rod into aperture 58. In this manner, rod 60 is pivotally attached to bushing member 52 above the longitudinal portion 36 of lever 34. A coil spring 64 fits over rod 60. A flange 66 is furnished on rod 60 to provide a support for coil spring 64. Rod 60 is adapted to pass through aperture 44 in the horizontal portion 42 of arm 40 so that coil spring 64 is compressed between horizontal portion 42 and flange 66 on rod 60.

Since the pivot point of rod 60 is above the rotational axis of the longitudinal portion 36 of lever 34, spring 64 will be maximally compressed when arm 40 is in the exact vertical position. Rotation of lever 34 in either direction to place arm 40 out of the vertical position will allow extension of spring 64. Hence, spring 64 acts to bias vertical arm member 40 away from the vertical position, either forwardly or backwardly. Arm member 40 is free to pivot forwardly and such pivotal motion will cause transverse finger 46 to engage the rail of a ladder and fasten the ladder to the rack, as will herinafter be more fully illustrated. A stop 68 is provided on the underside of longitudinal portion 36 of lever 34. Stop 68 abuts against cross member 10 when lever 34 is rotated to a position where the arm 40 is pivoted slightly backwardly from vertical. Spring 64 will thus act to bias lever 34 against stop 68, thereby allowing the mechanism to be set in an open or ladder-release position.

The use of the ladder rack of the present invention on a traditional van-type truck is illustrated by way of reference to FIG. 2. Cross members 10 and 12 are attached to the rain gutters 80 on the sides of van roof 82. A ladder 84 is shown supported on cross members 10 and 12 and fixed to the rack by attachment mechanism 30. A space is provided for the attachment of a ladder on the left side of cross members 10 and 12 by attachment mechanism 32. Mechanism 32 is locked with vertical arm 40 thereof pivoted slightly backwardly from vertical, as described hereinbefore. Hence, transverse finger 46 of attachment mechanism 32 is in a raised position so that a ladder can easily be slipped under that arm. The handle portion 38 on attachment mechanism 32 extends beyond the vertical plane of the van wall so that it may easily be operated by a person standing next to the truck.

The attachment of a ladder to the ladder rack is more fully illustrated by way of reference to FIG. 3. Ladder 90, illustrated in phantom, is placed over cross members 10 and 12 (not visible) with transverse finger 46 in the raised position. Transverse finger 46 is maintained in the raised position by backwardly pivoting vertical arm 40 until stop 68 engages cross member 10. In this position, spring 64 biases stop 68 against cross member 10 so that transverse finger 46 is maintained in a raised position. In this position, ladder stop 50 is depressed so as not to interfere with the rungs of ladder 90 when the ladder is being placed on the rack.

After ladder 90 has been placed in position on the rack over cross members 10 and 12, handle portion 38 of lever 34 is manually pivoted upwardly as illustrated by phantom 38'. Pivoting lever 38 upwardly requires a slight force to pivot arm 40 forwardly past the vertical position. This force is required to compress spring 64; however, the force required is quite small since handle 38 has mechanical advantage relative to arm 40. After arm 40 passes the vertical position, it is forwardly pivotally biased by spring 64 so that no further force whatsoever need be applied by the operator. Arm 40 is biased to move forwardly until transverse finger 46 engages one of the rails 92 of ladder 90, as illustrated by 46', whereupon arm 40 will be in the position denoted 40', with coil spring 64 extended as shown by 64'. In this position, spring 64' attempts to further downwardly bias arm 40', thereby urging transverse finger 46' against rail 92 of ladder 90. In this position, projection 48' provides a notch 49 (see FIG. 4) which engages and prevents transverse motion of ladder 90, while the force of spring 64' prevents longitudinal motion of the ladder. Also, ladder stop 50 is pivoted upwardly as illustrated by 50', and fits between and preferably against the rungs of ladder 90 to further prevent longitudinal translation of that ladder.

When the ladder 90 is to be removed from the ladder rack, the handle portion 38 of lever 34 is pulled downwardly until stop 68 engages cross member 10. In this position, the transverse finger 46 is locked in an open or ladder-release position, so that the ladder can be freely removed from the rack. Hence, the primary force which must be exerted when using the engagement mechanism of the present invention consists of merely pulling down on handle 38, which can be easily accomplished by the operator using the weight of his body.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

I claim:

1. In a rack for carrying ladders on a vehicle, said rack having at least two cross members over which the ladders are placed to support said ladders, improved means for releasably attaching the ladders to the cross members comprising:
    an arm pivotally attached at one end to one of the cross members so that said arm is pivotable between a first ladder-hold-down position and a second ladder-release position about an axis generally parallel to said cross member through a third position intermediate said first and second positions, said arm further having a generally horizontal apertured portion adjacent the other end;
    a finger extending transversely from the other end of said arm to engage the rail of a ladder supported on the cross members when said arm is in said first position;
    a rod pivotally attached to said cross member above the pivotal axis of the arm and extending through the apertured portion of said arm, the length of the rod between the pivotal axis of said rod and the apertured portion of said arm being at a minimum at the third position of said arm;
    a coil spring encircling said rod and compressed against the apertured portion of said arm, said first and second arm positions characterized by lesser spring compression than said third arm position so that said spring biases said arm towards said first arm position when said arm is between said first and third arm positions, and so that said spring biases said arm toward said second arm position when said arm is between said second and third arm positions; and
    lever means for pivoting said arm between said first and second positions.

2. A rack as recited in claim 1 wherein a stop is provided to maintain said arm at said second rod position against the urging of said spring, and wherein said stop is positioned to locate said second and third arm positions nearer to one another than said first and third arm positions so that relatively little force is required to move said arm from said second rod position to said third arm position.

3. A rack as recited in claim 1 wherein said finger has a notch on the underside thereof to engage a ladder rail and to prevent the ladder from sliding sideways relative to said cross member.

4. A ladder rack for carrying ladders on a vehicle, said rack comprising:
    a rectangular frame attachable to the roof portion of a vehicle, said frame having cross members adapted to support a ladder placed thereon and side members interconnecting the cross members;
    bracket means having an upright arm pivotally attached at its lower end to one of the cross members about an axis generally parallel to said cross member and a transverse finger extending from said arm adapted to overlie the rail of a ladder placed on the cross members, said bracket means including a generally horizontal apertured position adjacent its upper end;
    spring bias means adapted to pivotally bias the bracket means so that the transverse finger is urged against the rail of the ladder to attach said ladder to the frame, said spring bias means including a rod pivotally attached to the frame above the pivotal axis of the bracket means and extending through the apertured portion of said bracket means, and a coil spring encircling said rod and compressed against the apertured portion of the bracket means so that the transverse finger is urged against the rail of the ladder; and
    handle means connected to the bracket means and manually operable to pivot the bracket means to a position out of engagement with the ladder rail to permit insertion and removal of the ladder.

5. A ladder rack as recited in claim 4 wherein the transverse finger of the bracket means has an offset portion adapted to engage the rail of the ladder to prevent sideward motion of said ladder.

6. A ladder rack as recited in claim 4 and additionally comprising means for maintaining the bracket means in the said position out of engagement with the ladder rail to permit insertion and removal of the ladder.

7. In a rack for carrying a ladder on the roof of a vehicle, said rack comprising a frame releasably attachable to the roof of the vehicle and having at least one cross member for support of the ladder thereon, means for releasably attaching the ladder to the frame comprising:
    a lever having a longitudinal portion parallel to the cross member and rotably attached to said cross member so that the longitudinal portion is rotatable about the longitudinal axis of said longitudinal portion, and a handle portion angularly joined to said longitudinal portion;
    a bracket having an upright arm portion provided with an aperture at its upper end and fixedly attached at its lower end to the longitudinal portion of the lever so that said bracket is co-rotatable with said longitudinal portion, and a transverse finger portion extending from the upper end of said arm portion; and bias means adapted to rotatably bias the bracket to urge the transverse finger portion downwardly and comprising a rod pivotally attached to the cross member above the longitudinal portion of the lever and extending through the aperture and a spring encircling said rod and compressed against said arm portion at the aperture whereby the bias means urges the transverse finger portion downwardly to engage and hold the ladder on the cross member, and the handle portion of the lever is manually operable to rotate the bracket counter to the bias means to release the ladder.

8. In a rack for carrying ladders on a vehicle, said rack having at least two cross members over which the ladders are placed to support said ladders, improved means for releasably attaching the ladders to the cross members comprising:

an arm pivotally attached at one end to one of the cross members so that said arm is pivotable between a first ladder-hold-down position and a second ladder-release position about an axis generally parallel to said cross member through a third position intermediate said first and second positions, said arm further having an apertured portion adjacent the other end;

a finger extending transversely from the other end of the arm to engage the rail of the ladder supported on the cross members when said arm is in said first position;

a rod which is pivotally attached to said cross member above the pivotal axis of the arm and which extends through the apertured portion of said arm, the length of the rod from the pivotal axis of said rod to the apertured portion of the arm being at a minimum at the third position of said arm;

a coil spring encircling said rod and compressed against the apertured portion to bias the arm relatively away from the third position towards said first or said second positions;

a stop adapted to maintain said arm at said second arm position against the urging of said spring; and lever means for pivoting said arm between said first and second positions.

* * * * *